(12) United States Patent
Faher

(10) Patent No.: US 8,881,255 B2
(45) Date of Patent: Nov. 4, 2014

(54) SELECTION OF ACCESS CONDITIONS FOR PORTABLE TOKENS

(75) Inventor: Mourad Faher, Marly le Roi (FR)

(73) Assignee: Gemalto SA, Meudon (FR)

( * ) Notice: Subject to any disclaimer, the term of this patent is extended or adjusted under 35 U.S.C. 154(b) by 500 days.

(21) Appl. No.: 12/810,848

(22) PCT Filed: Dec. 18, 2008

(86) PCT No.: PCT/EP2008/067866
§ 371 (c)(1),
(2), (4) Date: Jul. 2, 2010

(87) PCT Pub. No.: WO2009/083473
PCT Pub. Date: Jul. 9, 2009

(65) Prior Publication Data
US 2010/0293191 A1   Nov. 18, 2010

(30) Foreign Application Priority Data

Dec. 27, 2007  (EP) ..................................... 07291633

(51) Int. Cl.
*H04L 29/06* (2006.01)
*G06F 21/77* (2013.01)

(52) U.S. Cl.
CPC ..................................... *G06F 21/77* (2013.01)
USPC ....... 726/9; 726/2; 726/20; 707/769; 707/786

(58) Field of Classification Search
None
See application file for complete search history.

(56) References Cited

U.S. PATENT DOCUMENTS

| | | | |
|---|---|---|---|
| 6,438,550 B1* | 8/2002 | Doyle et al. ........................ 726/2 |
| 7,111,321 B1* | 9/2006 | Watts et al. ........................ 726/2 |
| 7,552,467 B2* | 6/2009 | Lindsay ............................. 726/5 |
| 7,613,929 B2* | 11/2009 | Cohen et al. .................. 713/186 |
| 7,716,291 B2* | 5/2010 | Thorson ......................... 709/206 |
| 7,912,777 B2* | 3/2011 | Freud et al. ...................... 705/37 |
| 8,078,669 B2* | 12/2011 | Ladd et al. ...................... 709/203 |
| 2001/0030959 A1* | 10/2001 | Ozawa et al. ................... 370/386 |
| 2003/0093812 A1* | 5/2003 | Chang et al. ................... 725/133 |
| 2003/0163695 A1* | 8/2003 | Irisawa et al. .................. 713/170 |
| 2004/0172552 A1* | 9/2004 | Boyles et al. .................. 713/200 |
| 2004/0220791 A1* | 11/2004 | Lamkin et al. ................... 703/11 |
| 2004/0243580 A1* | 12/2004 | Markki et al. .................... 707/9 |
| 2006/0122939 A1* | 6/2006 | Cohen et al. ..................... 705/59 |
| 2009/0083147 A1* | 3/2009 | Paila et al. ...................... 705/14 |
| 2009/0119724 A1* | 5/2009 | Lemmers ......................... 725/87 |

FOREIGN PATENT DOCUMENTS

| | | | | |
|---|---|---|---|---|
| EP | 1306764 A1 * | 5/2003 | ............. G06F 12/14 |
| FR | 2799021 A1 | 3/2001 | |
| FR | 107829 A2 | 9/2007 | |

OTHER PUBLICATIONS

Davis, Russell. Network Authentication Tokens. Fifth Annual Computer Security Applications Conference. Pub. Date: 1989. Relevant pp. 234-238. http://ieeexplore.ieee.org/stamp/stamp.jsp?tp=&arnumber=81056.*
Guven, Sinem; Podlaseck, Mark; Pingali, Gopal. PICASSO: Pervasive Information Chronicling, Access, Search, and Sharing for Organizations. Third IEEE International Conference on Pervasive Computing and Communications. Pub. Date: 2005. Relevant pp. 314-350. http://ieeexplore.ieee.org/stamp/stamp.jsp?tp=&arnumber=1392774.*
ISO: "7816 part 4: Interindustry command for interchange" International Standard ISO/IEC, XX, XX, vol. 7816, No. 4, Sep. 1, 1995, pp. 1-73, XP002169265 paragraph [0008]—paragraph [0009].
* cited by examiner

*Primary Examiner* — Dede Zecher
*Assistant Examiner* — Jeremiah Avery
(74) *Attorney, Agent, or Firm* — The Jansson Firm; Pehr B. Jansson

(57) ABSTRACT

The invention relates to a portable token (SC) comprising a capability query mechanism (CQM). The capability query mechanism (CQM) is set to inform entities (PC, MW) willing to communicate with the portable token (SC) of at least a subset of the command(s) (C) available in the portable token (SC). The portable token (SC) is arranged to set a flag when the capability query mechanism (CQM) is invoked. When a command (C) is called, the portable token (SC) enforces first access conditions (AC1) for the command (C) if the flag is set, or second access conditions (AC2) if the flag is cleared.

11 Claims, 1 Drawing Sheet

SELECTION OF ACCESS CONDITIONS FOR PORTABLE TOKENS

BACKGROUND OF THE INVENTION

1. Field of the Invention

The invention relates to a portable token which commands can be protected by access conditions. It also relates to a system comprising a portable token and a middleware for accessing the portable token, and to a method for selecting the access conditions applicable to a portable token.

2. Description of the Related Art

In the context of the invention, portable tokens are electronic devices which can be easily carried by an individual, and which can receive orders from other entities in the form of commands. Common examples of portable tokens include smart cards, USB keys, MMC or SD cards, etc. smart cards have various applications (e.g. bank cards for financial applications, SIM cards for mobile telephony, contact-less cards such as Navigo for public transportation, healthcare cards such as Sesame Vitale, etc.). Smart cards can implement a contact interface, a contact-less interface, or both contact and contact-less interfaces. They can also offer different types of interfaces in the same category (e.g. ISO 7816 and USB are both contact interfaces which can be simultaneously supported by a given smart card).

Certain portable tokens offer security features allowing them to protect access to their commands based on access conditions. An entity willing to read certain private data from such portable token may be denied access if it does not prove its knowledge of a PIN code or of a cryptographic key, while the same entity would be authorized to read public data or to call all sorts of innocuous commands. On ISO 7816 compliant portable tokens, access conditions defining the level of protection of commands giving access to sensitive data or/and services, including cryptographic services such as digital signature, is mainly performed via ISO/IEC 7816-4 security architecture (see for example clause 5.4). Security attributes are attached for example to data (data comprise files and logical data structures), or to cryptographic objects (including objects nested in files or in logical data structures), and typically comprise access mode bytes and related security conditions. Such security attributes are generally nested in a File Control Parameter template (see for example clause 5.3.3). Such security attributes are static, in the sense that they are the same whatever the environment from which the portable token receives commands. ISO/IEC 7816-4 does not provide any specific means to distinguish between two or more different environments and to define dynamic access conditions wherein a different set of security attributes is used depending on the current environment. The term environment encompasses not only the interface through which the communication takes place, but also the entity initiating the communication with the portable token by sending commands. For example two different entities could send commands through the same interface (e.g. a IEEE 1394 firewire interface), or the same entity could send commands alternatively through several interfaces (e.g. a USB interface, an ISO 7816 interface, and a Mifare contact-less interface). In both cases, the environments are different, and ISO 7816-4 does not address the possibility to tailor the access conditions to each environment.

ISO 24727 specifies certain environments for smart cards and possibly other types of portable tokens. An initial step of a transaction in a 24727-environment is the bootstrap mechanism described in ISO/IEC 24727-2—Identification cards—Integrated circuit card programming interfaces—Part 2: Generic Card Interface. The ATR (Answer To Reset, standardized in ISO 7816), is the answer of a smart card to a reset signal, and consists in a series of bytes informing the terminal to which the smart card is connected of the characteristics of the smart card. After ATR/ATS, the Generic Card Access Layer (GCAL) part of a 24727 middleware stack may read a Card Capability Container called CCD from the smart card. The CCD comprises a set of data objects that deliver information reflecting the smart card capabilities to the middleware. Several alternatives are available through the standard (ref. ISO/IEC 24727-2 clause 6.4.2) for determining the value of the CCD. For example, the CCD may be obtained from the initial data string as per ISO/IEC 7816-4, by GET DATA based on the CCD, by reading the relevant part of EF.ATR, or by selecting a dedicated alpha card-application hosting the CCD and by then applying a GET DATA to retrieve the CCD. The CCD should preferably be available on smart cards in order to fit properly in 24727 environments. The CCD typically contains a piece of bytecode called "Procedural Elements" and nested in a data object 'A1' called "Procedure Elements Description Template". These Procedural Elements are used mainly to translate the generic APDUs from the Service Access Layer into APDUs understandable by the smart card. This translation takes place in the Generic Card Access Layer (GCAL). Procedural Elements are however not mandatory in ISO 24727, and some smart cards may implement the generic set of APDUs employed by the Service Access Layer (SAL ref. ISO/IEC 24727-3) and consequently do not require Procedural Elements since no translation is in principle necessary.

One problem with state of the art portable tokens is that they lack flexibility in their management of access conditions.

SUMMARY OF THE INVENTION

It is an object of the invention to propose a portable token which access conditions can be better adapted to the environment in which the portable token operates, in particular in an ISO 24727 context.

BRIEF DESCRIPTION OF THE DRAWINGS

The invention and its advantages will be explained more in details in the following specification referring to the appended drawings, in which.

DETAILED DESCRIPTION

Figure 1:
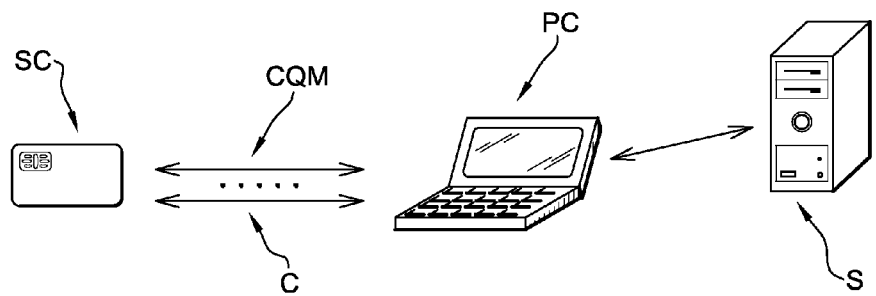
FIG. 1 represents a system comprising a server S, a personal computer PC and a personal token SC.

A portable token SC according to a preferred embodiment of the invention comprises a capability query mechanism CQM. The capability query mechanism CQM is set to inform entities willing to communicate with the portable token SC of at least a subset of the command(s) C available in the portable token SC. The command C typically consists of a piece of software accessible through an application programming interface API. It can be one of the commands provided by an operating system installed on the portable token, such as a READ_BINARY APDU command according to ISO 7816-4. The capability query mechanism CQM is typically used by entities not knowing the portable token SC in advance, i.e. not knowing exactly which features it has. It may also be used by entities knowing the features, but not knowing the specific version, and therefore not knowing the details of how the commands of the portable token operate. The capability query mechanism CQM may return a list of all commands which are supported, or a subset of the commands. For example, it may report only publicly documented commands and discard certain proprietary commands which are not supposed to be used by third parties. Alternatively, the capability query mechanism CQM can simply report an identifier of the portable token type and version, or any other information (serial numbers, etc.) from which the entity (PC, MW) can infer the features of the portable token SC, possibly through a database. The portable token SC is arranged to set a flag when the capability query mechanism CQM is invoked, and, when a command C is called, to enforce first access conditions AC1 for the command C if the flag is set, or to enforce second access conditions AC2 for the command C if the flag is cleared. For example, the first access conditions AC1 may mandate a PIN code presentation in addition to a challenge response for the command C (e.g. a command for reading sensitive data) when the command C is called with the flag set (which indicates that it comes from an environment not knowing the portable token in advance), while second access conditions AC2 may require a challenge response authentication only, the command C being called with the flag cleared (indicating that it comes from an environment knowing the portable token). It is possible to achieve the same goal with mechanisms equivalent to a flag (e.g. a variable containing an indication that the capability query mechanism CQM has been invoked, etc.).

In a portable token SC according to a preferred embodiment, the capability query mechanism CQM is further set to notify said entities of a first format F1 for the command(s) C. The flag is set only if a command C is received with said format F1. Of course, it would be possible to define a multiplicity of formats and to associate different access conditions for each possible format. E.G. if the entity knows a format F3 other than the format F1 reported by the capability query mechanism, the portable token SC could react to format F3 by applying third access conditions AC3. The format F1 for the command may vary from other possible formats simply by one field, which may contain a different value. The format may be notified by sending the whole format of the command, e.g. by listing its name and/or code, its input parameters, the range of values accepted by each input parameter, etc. The format notification may also be much simpler. For example the format notification may simply contain one of the input parameters of the command, which should be set to a specific value in order for the command C to be recognized as having format F1 or other. It may be even simpler, and merely consist in a pointer to a database of formats, or a format identifier, etc. In possible embodiments, the format notification issued by the capability query mechanism consists of pieces of information allowing the entity to convert a "generic" command into a command understandable by the portable token, wherein according to the translation, the translated command reveals to the portable token that it has been translated and not built directly by the entity sending the command to the portable token. The translation may be apparent for example if one of the input parameters contains a flag "translation" set to TRUE, or any input value indicating that a translation occurred, for example if the command is an ISO 7816 APDU, the class of the command may be different if the APDU has been translated. The indication of the format may also be located in one of the many fields of one of the input parameters (instead of constituting itself an input parameter, which may make it easier to reverse engineer). An environment knowing the portable token SC in advance and calling a command C with the format F1 would nonetheless enjoy second access conditions AC2 if it didn't have to call the capability query mechanism CQM in order to build the command C with format F1. Once the flag has been set, it is possible to leave it set until the end of the session, which results in all subsequent commands being run with first access conditions AC1, irrespective of the format of such subsequent commands. This is convenient for systems where a given environment is associated with a whole session of the portable token. For example when buying a train ticket from a train station dedicated ATM with a smart card, the smart card remains in the train station dedicated ATM environment. When it is extracted, it is typically powered down (smart cards are typically powered by the terminal, unless they have a battery, which is still very rare). When powered down, all RAM memory is cleared, including the flag which is preferably in RAM. In alternative embodiments, it is possible to require each command to be sent with the first format F1 in order that it be subject to first access conditions AC1 (i.e. any command, within the same session, which is not sent with the first format F1 would be subject to second access conditions AC2). However, this alternative is not very useful in general, especially considering that second access conditions AC2 are typically more lax than first access conditions AC1. In another alternative, the flag could remain set until a particular event clears it, for example a command received with a certain format, or a special command for clearing the flag. It should be understood that first access conditions AC1 are in fact a set of access conditions, since the access conditions may vary from command to command. The same is true for second access conditions AC2. In other words, each command may be associated with a given access condition (first or second), which is potential different from access conditions (either first or second) applied to another command. For example the first access condition for reading the user's certificate may be "PIN code verification", the second access condition for reading the user's certificate may be "always" (meaning that there is no restriction on this command), while for updating the user's certificate, the first access condition may be "never" (meaning that it is impossible to carry out this operation) while the second access condition may be "AES challenge response" (meaning that there must be a cryptographic authentication using the AES algorithm and a key shared between the personal token SC and the middleware MW).

The first access conditions AC1 can be more stringent than second access conditions AC2. This amounts to raising the bar for environments which do not know the personal token at all. For example, when the portable token SC is connected to a first environment well known to the issuer, implementing a dedicated middleware MW, and that may be considered a priori secure, the portable token enforces second access conditions AC2. But when the portable token is connected to another environment based on another middleware stack or any equivalent intermediate set of software/hardware components capable of recognizing the portable token SC (with the capability query mechanism CQM), wherein this other environment is less trusted, first access conditions AC1 are enforced.

In preferred embodiments, the portable token is a smart card, and the command C is an ISO 7816-4 compliant command, for example it can be the command SELECT.

Figure 2:
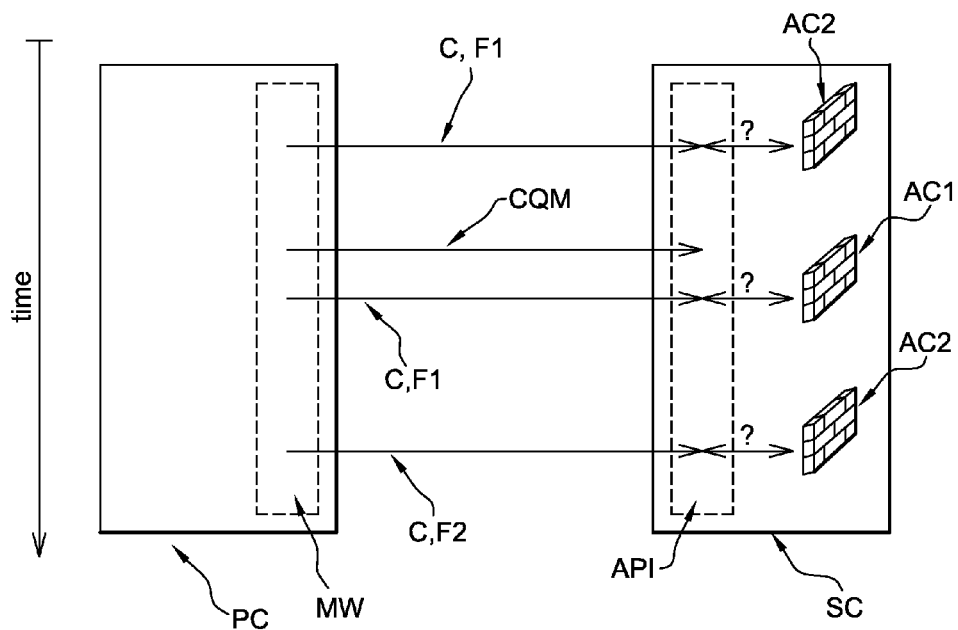
FIG. 2 is a symbolic representation of a series of commands exchanged between a personal computer PC and a personal token SC.

FIG. 2 illustrates a communication between a middleware MW (e.g. piece of software, typically a set of DLLs) installed on a personal computer PC and a smart card SC according to the invention. The communication is fictitious, and used only to illustrate the behavior of a smart card SC according to the invention depending on the behavior of the middleware MW.

The smart card SC comprises an application programming interface API allowing entities such as the middleware MW to communicate with it. The middleware MW first sends a command C with a format F1 (top arrow), while no capability query mechanism CQM has been invoked. The smart card SC therefore checks whether second access conditions AC2 (illustrated by a wall) have been met before executing the command C. At a later time, the middleware MW queries the smart card SC for its capabilities using the capability query mechanism CQM (second arrow from top). The capability query mechanism CQM may consist in a regular smart card command (e.g. APDU), or in series of commands, etc. The middleware then sends, within the same session, a command C with the format F1 (third arrow). The smart card SC enforces first access conditions AC1 since the conditions for setting the flag have been met. From this time, it is possible either to apply first access conditions AC1 to all subsequent commands within the same session (e.g. until the smart card SC is powered down or reset). But in an alternative embodiment represented on FIG. 2, the smart card may detect that a command C with a second format F2 has been sent (fourth arrow) and decide that the flag should be cleared. Therefore, in such alternative embodiment, second access conditions AC2 are applied again, until the conditions for setting the flag are met again.

The invention also relate to a system comprising a portable token SC as described above. The system comprises a middleware MW, wherein the middleware MW is set either to query the portable token SC for its capabilities, the middleware MW being thereby requested to comply with first access conditions AC1 when calling a command C of the portable token SC, or to call a command C without having previously queried the portable token SC for its capabilities, being thereby requested to comply with second access conditions AC2. The middleware MW typically resides on a personal computer PC (e.g. a laptop) from which a user connects to a server S delivering a given service (e.g. online shopping, etc.), as illustrated on FIG. 1. The middleware MW may be used for example by the personal computer PC in order to authenticate the user to the server S by using credentials stored in the portable token SC. According to a possible embodiment of the invention, access conditions may also be made dependent on a specific context determined by the middleware stack (for example secure and insecure context) or/and the intermediate software and hardware layers located between an application running on the portable token SC and an electronic service application running on the server S. Such system is advantageous because it assists in protecting data and/or services, including cryptographic services operated in the portable token, according to the environment, while no obvious criteria so far allowed identifying the environment from the portable token. While contact versus contact-less environments could be easily differentiable by a portable token, two different middleware stacks relying on the same hardware interface in order to communicate with the portable token are not easy to distinguish, unless a technique according to above described embodiments is implemented.

In a preferred embodiment described below the portable token is an ISO 7816 compliant smart card, and the middleware is compliant with ISO 24727. In preferred embodiments, the smart card keeps track of the 24727 bootstrap mechanism. When the environment attempts to read the CCD while no application is selected except the alpha card-application that might be selected first, the smart card raises reversibly a flag called VSR. The alpha card application is defined in ISO 24727, as an application which provides application-independent information (as defined in ISO/IEC 7816-4) such as card, file, and card-application management information. This VSR flag may be examined by the application currently running in the smart card, informing it that the environment to which the smart card is connected is most likely a 24727-environment. Accordingly, the current card application may define certain access conditions (e.g. unlock or lock some data or services, or apply different security rules).

The invention also relate to a method for a personal token SC to select the access conditions enforced by the personal token SC when an entity (PC, MW) calls a command C of the portable token SC, wherein the entity (PC, MW) invokes a capability query mechanism CQM of the portable token SC in order to be notified of at least a subset of the command(s) C available in the portable token SC, thereby enjoying first access condition AC1 for the command C, or the entity (PC, MW) does not invoke the capability query mechanism CQM, thereby enjoying second access condition AC2 for the command C.

In preferred embodiments, the flag remain set without need for repeatedly calling the capability query mechanism CQM before each command C (this would typically affect the performance significantly). In a preferred method according to the invention, in order for the portable token SC to enforce the first access condition AC1 for the command C, the capability query mechanism QCM is further set to notify the entity (PC, MW) of a first format F1 for the command(s) C. The portable token SC enforces the first access condition AC1 only once a command C has been called with the first format F1.

In a preferred embodiment, the personal token SC is a smart card, and the method implements the following steps.

A smart card SC is inserted in a reader connected to a terminal PC running a 24727-compliant middleware.

According to ISO/IEC 24727, a bootstrap mechanism takes place: the middleware applies a procedure to read the CCD out of the smart card. The APDU commands that might be sent to the smart card for that purpose are typically as follows:

SELECT AID (using AID='E8 28 81 C1 17 02' according to ISO 24727-2 clause 6.4.2) to select the alpha card application SELECT EF.ATR (using FID='2F01' according to ISO/IEC 7816-4:2005 clause 7.4.2) to select the EF.ATR out of which CCD can be read with a subsequent GET DATA command APDU command in accordance with the "initial access data" (as defined in ISO/IEC 7816-4:2005 clause 8.1.2) present in the historical bytes of the ATR, ATS or answer to ATTRIB None of the APDU commands described above are subject to translation bytecode (they are not processed by the Procedural Elements) because those APDU commands are used to retrieve the CCD value. The Procedural Elements are extracted out of the CCD and therefore typically do not apply prior to the CCD disclosure.

Upon detection of a request to read the CCD, such as a GET DATA with a P1-P2='7F62' and Le='00' or alternatively a GET DATA with P1-P2='3FFF' and command data field containing '5C027F62', the smart card delivers the CCD. The smart card is preferably personalized with a CCD hosting Procedural Elements with a specific instruction confirming that the translation code is being run on GCAL layer and giving a reasonably high level of confidence, when receiving a translated command and analyzing it, that the environment from which the command was sent is actually enabled with 24727 features. The Procedural Elements supplied by the smart card are therefore preferably such that the first APDU command delivered by the GCAL contains and indication (for instance a specific data object) denoting that the Procedural Elements were run. The APDU command most likely to be the first to be translated by the Procedural Elements is a SELECT command for selecting a card application. The smart card application identifiers are typically supplied in the CCD in the data object 'A0' as a sequence of application identifiers of card-applications (ref. ISO/IEC FCD 24727-2 clause 6.1 Table 14).

The smart card sets the 'VSR' flag if two conditions are fulfilled:
  the CCD is retrieved with one of the methods described above
  an APDU command that is identified as having been subject to processing by the Procedural Elements is received. Such APDU command is typically a SELECT APDU for selecting a card application and starting a transaction.

Therefore, in a preferred embodiment, upon first selection of an application referenced by its identifier in the CCD, the smart card raises a 'VSR' flag. The SELECT APDU command is typically identified as a translated command by conveying in its data field further discretionary information in addition to the AID template. This additional information is up to the issuer, and its very presence in the SELECT APDU command denotes the effective translation procedure. It is possible to implement a 'VSR' flag maintenance mechanism which, while reflecting the smart card middleware environment, does not require the presence of procedural elements. It is for example possible to rely on other structures for the translation rules, such as the CardInfo structure promoted by some German players. It is possible to use a translated command other than the SELECT APDU as a trigger. The smart card issuer typically carries out the personalization of his cards according to standard recommendations and prepares a translation bytecode (Procedural Elements). When doing so, the issuer can implement a discretionary procedure in this translation code in order to stamp the APDU commands of his choice. Therefore, it is not necessary to stamp all APDU commands. Stamping one APDU is sufficient, and it is preferably the first APDU output by the translation code which is stamped. For instance, it is not necessarily possible to know which card application will be selected first by the terminal (in case several card applications are present in the smart card), and instead of stamping all SELECT AID commands, to only stamp the first one that is sent by the middleware, on the fly. Other alternatives are possible in case the smart card raises the 'VSR' flag upon reception of APDU commands other than SELECT for card applications which identifier is listed in the CCD. The first APDU command processed by the translation code (Procedural Elements) is up to the smart card issuer and may be whatever APDU command likely to be submitted to the translation code by the GCAL.

Before executing any action, the current card application checks the flag value to determine whether the bootstrap mechanism took place or not and whether a GCAL is running in the middleware stack.

If the 'VSR' flag is raised (for instance its value is set to 0x01), the card application adapts a more stringent access condition (e.g. on a set of data in a file belonging to this application). For instance, the card application may require a PIN code to be verified before disclosing the set of data.

The invention is particularly advantageous in the context of CEN/TS 15480-2—Identification card systems—European Citizen Card—Part 2: Logical data structures and card services.

It can be expected that the invention will be useful in the context of currently ongoing standardization efforts such as ISO/IEC FCD 24727-3—Identification cards—Integrated circuit card programming interfaces—Part 3: Application interface. This standard specifies a new distributed middleware and a mechanism for card discovery. Such ISO/IEC 24727 compliant middleware are likely to be extremely useful in particular in deployments of eAdmin, eGov or eID services. The invention is a complement to such middleware based architectures allowing a better management of access conditions to the portable token.

The invention is advantageous by its simplicity, since it avoids having to carry out an authentication of the environment to the portable token, in order for the portable token to figure out that it is engaged in a 24727-compliant environment, and to apply a specific set of access conditions to given data or services, including cryptographic services, while the same data or services are protected by different access conditions in other environment(s). Authenticating the environment would typically mean authenticating a terminal to which the portable token is connected, as well as certain software components running on the terminal. Such authentication would be a complex task, since it would typically require distributing cryptographic key material in the terminal. In addition, the terminal is not necessarily highly trusted, therefore the authentication would not necessarily provide a much higher level of security compared to the invention (which adapts the access conditions to a behavior of the environment, rather than to a cryptographic authentication of the environment).

On certain portable tokens, data are always readable in a dedicated environment such as dedicated terminals delivering electronic services (such as update of Sesame Vitale healthcare cards by special terminals located in French Sécurité Sociale premises) and implementing an intermediate set of software/hardware components dedicated to these portable tokens, while the same data must be protected differently in another environment with more stringent rules such as a personal computer of a doctor in which the smart card is inserted, bearing in mind that the doctor's personal computer is not necessarily well protected and could be infested with viruses. For instance a private set of information read out of the portable token without restriction in a dedicated environment may require preferably a higher protection in an ISO 24727 environment, or some services performed by the portable token may become accessible or be preferably locked in a 24727-environment. Of course, highly sensitive commands should be adequately protected with stringent access conditions even in a secure environment (and not only in the other environment), since it cannot be excluded that a clever virus would find a way to mimic a secure environment and be granted the lowest access conditions of the two environments (typically second access conditions AC2 rather than first access conditions AC1).

It is expected that future ISO/IEC 24727 architecture will support legacy systems. This means that smart card already issued and embedding card applications enabled for existing terminals, could be re-issued with further applications (e.g. customized applications) in order to fit with both ISO 24727 framework and former environments. A smart card according to the invention, enabled for ISO/IEC 24727 environment, could access and or deliver services in other environments. Some data handled in former environments might become subject to different security rules in an ISO/IEC 24727 context. This is particularly important for smart card bearer's private data (privacy enhancement depending on the environment) or for restricted smart card functions like digital signature (digital signature could be locked in ISO 24727 environment but authorized in dedicated environments).

The invention claimed is:

1. A portable token (SC) comprising: a capability query mechanism (CQM), the capability query mechanism (CQM) being set to inform entities (PC, MW) willing to communicate with the portable token (SC) of at least a subset of the command(s) (C) which are supported by the portable token (SC), and a mechanism to set a flag when the capability query mechanism (CQM) is invoked, and, when a command (C) is called, to enforce first access conditions (AC1) to be performed to gain access for the command (C) if the flag is set, or to enforce second access conditions (AC2) differing from the first access conditions and to be performed to gain access for the command (C) if the flag is cleared.

2. The portable token (SC) according to claim 1, wherein the capability query mechanism (CQM) is further set to notify said entities of a first format (F1) for the command(s) (C), and wherein the flag is set only if a command (C) is received with said format (F1).

3. The portable token (SC) according to claim 1 or 2, wherein the first access conditions (AC1) are more stringent than second access conditions (AC2).

4. The portable token (SC) according to claim 1 or 2, wherein the portable token is a smart card, and the command (C) is an ISO 7816-4 compliant command.

5. A system comprising: a portable token (SC) having capability query mechanism (CQM), the capability query mechanism (CQM) being set to inform entities (PC, MW) willing to communicate with the portable token (SC) of at least a subset of the command(s) (C) supported by the portable token (SC), and a mechanism to set a flag when the capability query mechanism (CQM) is invoked, and, when a command (C) is called, to enforce first access conditions (AC1) to be performed to gain access for the command (C) if the flag is set, or to enforce second access conditions (AC2) different from the first access conditions (AC1) and to be performed for the command (C) if the flag is cleared; and a middleware (MW), the middleware (MW) being set either:

to query the portable token (SC) for its capabilities, the middleware (MW) being thereby requested to comply with first access conditions (AC1) when calling a command (C) of the portable token (SC), or to call a command (C) without having previously queried the portable token (SC) for its capabilities, being thereby requested to comply with second access conditions (AC2).

6. A method for a personal token (SC) to select the access conditions enforced by the personal token (SC) when an entity (PC, MW) calls a command (C) of the portable token (SC), wherein the entity (PC, MW) invokes a capability query mechanism (CQM) of the portable token (SC) in order to be notified of at least a subset of the command(s) (C) supported by the portable token (SC), thereby enjoying first access condition (AC1) which is to be performed to gain access for the command (C), or the entity (PC, MW) does not invoke the capability query mechanism (CQM), thereby enjoying second access condition (AC2) differing from the first access condition (AC1) and to be performed to gain access for the command (C).

7. The method according to claim 6, wherein, in order for the portable token (SC) to enforce the first access condition (AC1) for the command (C), the capability query mechanism (QCM) is further set to notify the entity (PC, MW) of a first format (F1) for the command(s) (C), and wherein the portable token (SC) enforces the first access condition (AC1) only once a command (C) has been called with the first format (F1).

8. The portable token (SC) according to claim 3, wherein the portable token is a smart card, and the command (C) is an ISO 7816-4 compliant command.

9. The system according to claim 5 wherein the capability query mechanism (CQM) is further set to notify said entities of a first format (F1) for the command(s) (C), and wherein the flag is set only if a command (C) is received with said format (F1).

10. The system according to claim 5 or 9, wherein the first access conditions (AC1) are more stringent than second access conditions (AC2).

11. The system according to claim 5 or 9, wherein the portable token is a smart card, and the command (C) is an ISO 7816-4 compliant command.

* * * * *